Sept. 28, 1937.  A. J. BAKER  2,094,089
ILLUMINATING APPARATUS
Original Filed Jan. 27, 1933    3 Sheets-Sheet 1

INVENTOR
ARTHUR J. BAKER
BY
ATTORNEY

Sept. 28, 1937. A. J. BAKER 2,094,089
ILLUMINATING APPARATUS
Original Filed Jan. 27, 1933   3 Sheets-Sheet 2

INVENTOR
ARTHUR J. BAKER
BY Chester H Braselton
ATTORNEY

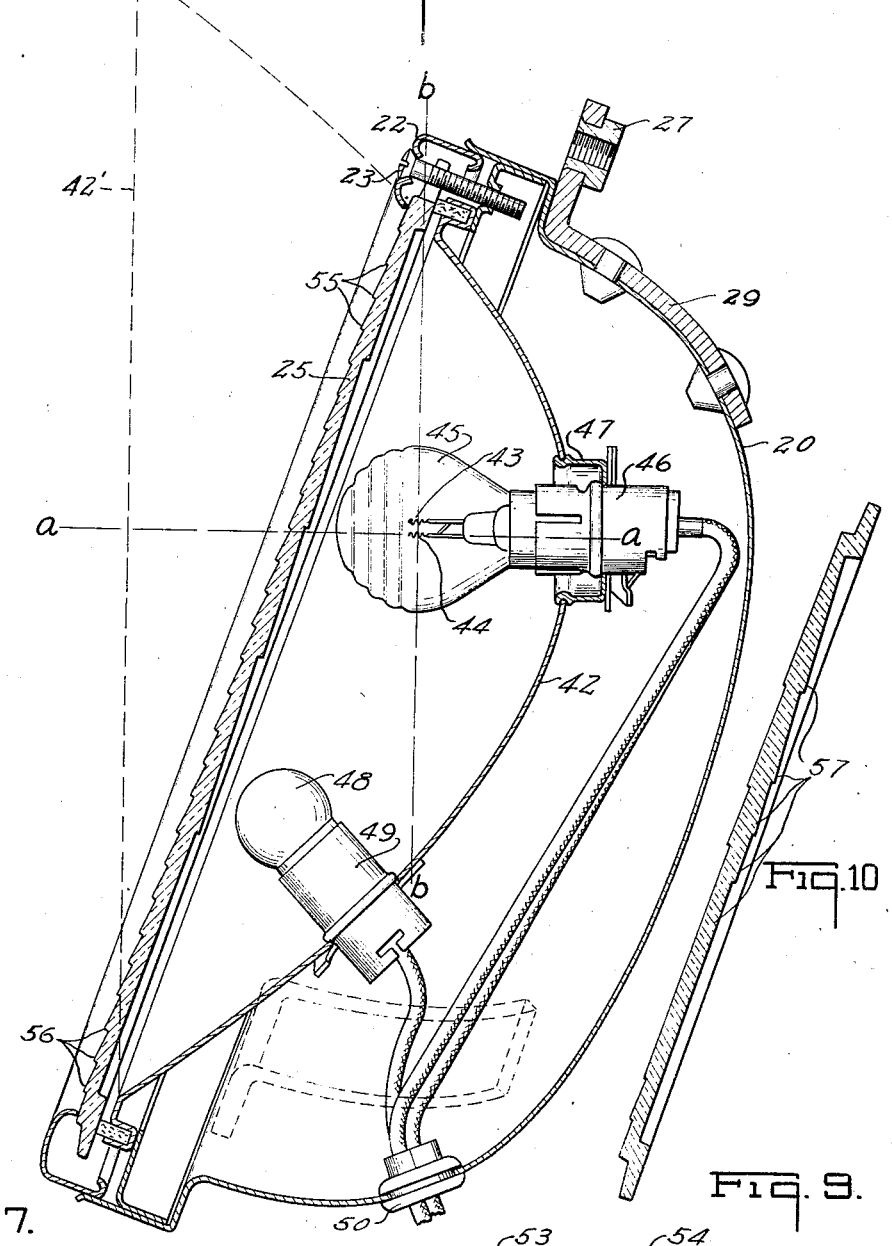

Patented Sept. 28, 1937

2,094,089

UNITED STATES PATENT OFFICE 2,094,089

ILLUMINATING APPARATUS

Arthur J. Baker, Toledo, Ohio, assignor, by mesne assignments, to Willys-Overland Motors, Inc., a corporation of Delaware Original application January 27, 1933, Serial No. 653,780. Divided and this application May 17, 1934, Serial No. 726,053

4 Claims. (Cl. 240—8.1)

This invention, a division of my copending application Serial No. 653,780, filed January 27, 1933, which has eventuated into Patent 1,963,608 on June 19th, 1934, relates to lighting apparatus and more particularly to a headlight arrangement or lighting system for automotive vehicles.

The invention contemplates a lighting arrangement incorporating a novel means for adjusting the direction of the light beams emitted from a light source without modifying the relative position of the light source with respect to the reflecting means.

The invention further embraces a novel headlamp construction capable of providing a controllable light beam and utilizing a novel lens structure slantingly arranged with respect to the normal path of the light beam.

The invention embraces the provision of a headlight arrangement wherein the lens is positioned at an angle oblique to the projected light beam capable of being supported in streamlined or harmonized relation with respect to the contour of other parts of the automotive vehicle.

A further object of the invention resides in the provision of simple and effective adjusting means accessible exteriorly of the headlight and its support for properly directing the light beams to obtain satisfactory illumination.

A further object of the invention resides in an arrangement of combined vehicle fender and headlamp construction wherein the fender forms a housing and support for the vehicle headlamp arrangement.

A still further object of the invention contemplates the utilization of a reflector of novel construction having desirable light beam controlling and projecting characteristics and eliminating certain disadvantages of the ordinary reflector.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 6 is an enlarged vertical sectional view showing structural details of my invention;

Figure 7 is a detail sectional view through the lens forming a part of my invention taken substantially on a line 7—7 of Figure 3.

Figure 8 is a detail sectional view taken substantially on a line 8—8 of Figure 3;

Figure 9 is a detail sectional view taken substantially on a line 9—9 of Figure 3;

Figure 10 is a detail sectional view taken substantially on a line 10—10 of Figure 3.

Figure 1:
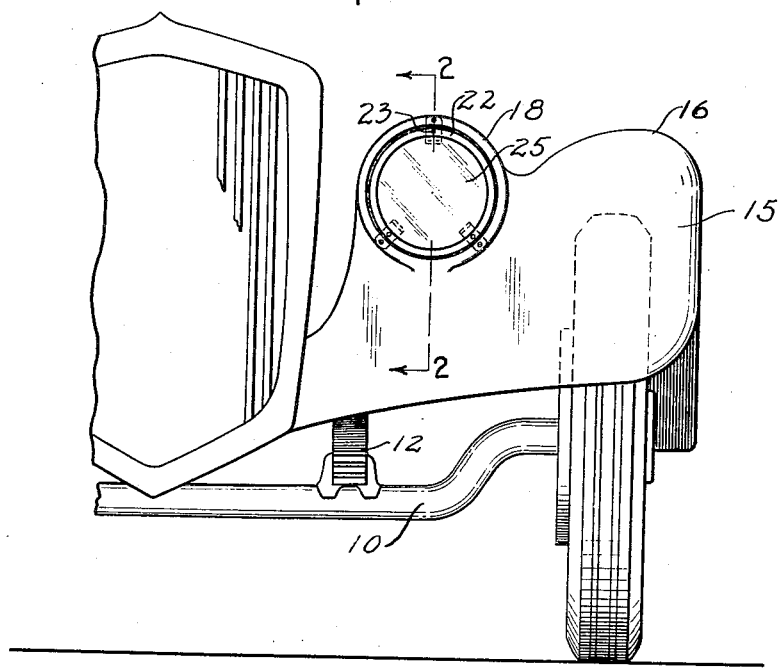
Figure 1 is a front view of a portion of an automotive vehicle with which is incorporated the lighting system of my invention.

While I have illustrated a form of the illuminating apparatus of my invention as particularly adapted for use with automotive vehicles, it is to be understood that I do not wish to limit the invention to the particular adaptation illustrated and that I contemplate its use wherever the same may be found to be applicable.

Referring to the drawings in detail, a form of the invention is illustrated as supported in a fender structure 15 of an automotive vehicle which fender may be supported by the vehicle frame or chassis (not shown) carried upon an axle 10 through the medium of a leaf spring structure 12, the fender 15, in the form shown, being provided with a crown 16 which blends into a supporting housing 18 to accommodate the headlamp structure forming a so-called "streamlined" construction. This particular mounting eliminates a number of parts such as brackets, braces and the like heretofore utilized to support the fender and headlamp structures. Carried by the housing 18 and adjustably and removably secured therein in a manner and for a purpose to be hereinafter more fully explained, is a lamp casing or body member 20 forming an enclosure for the reflector, light sources and lens structure. A rim or ring 22 positions and retains the lens 25 which is removably supported adjacent the front of the body or casing 20 by means such as the screws or studs 23.

Figure 2:
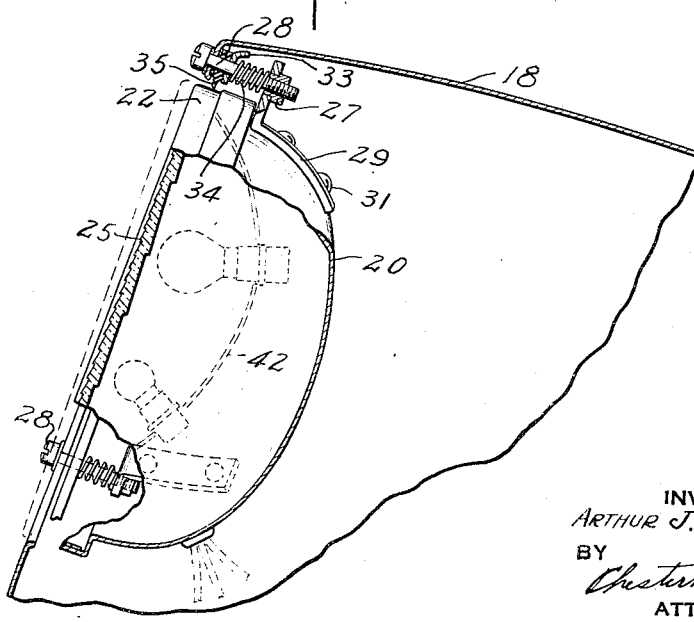
Figure 2 is a detail sectional view taken substantially on a line 2—2 of Figure 1.
Figure 3:
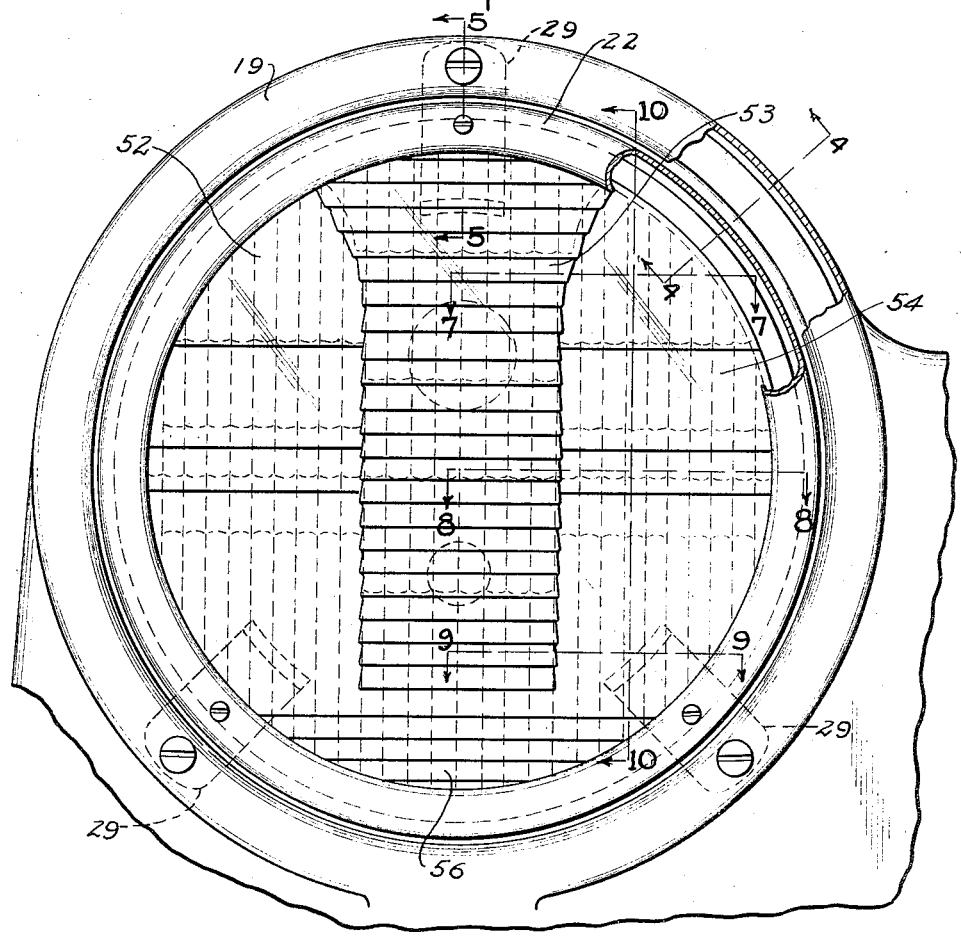
Figure 3 is an enlarged front view of the headlamp shown in Figure 1.
Figure 4:
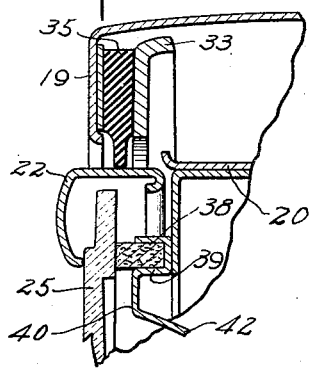
Figure 4 is a detail sectional view taken substantially on a line 4—4 of Figure 3.
Figure 5:
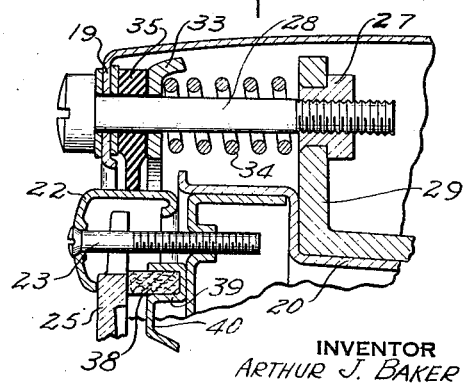
Figure 5 is a detail sectional view taken substantially on a line 5—5 of Figure 3.

Referring more particularly to Figures 2, 3, and 5, means are provided for adjustably retaining the casing 20 of the headlamp relative to the outer housing or compartment 18 in the fender skirt to vary the direction of the light beams. The adjusting means is shown in the form of a plurality of screw threaded elements 28 connecting casing 20 and an inwardly turned annular flange 19 of the outer casing or support 18, and I have found that three of these elements spaced substantially 120° apart provide satisfactory adjustment, though I do not wish to be limited to any specific number of connecting elements. The elements 28 have screw threaded engagement with bushings 27 preferably fixed in bracket members 29 riveted as at 31 or otherwise suitably secured to the casing 20. An annulus or ring member 33 is positioned interiorly of the flange 19 and serves to properly retain a rubber or flexible sealing gasket 35 and cooperates with resilient members or springs 34 interposed between brackets 29 and the ring member, the springs urging the brackets 29 and casing 20 to a predetermined position with respect to the supporting casing 18. It will be noted that the gasket 35 embraces and contacts with the outer periphery of the rim 22 of the headlamp and prevents the ingress of water, dirt and other foreign substances as well as to eliminate metallic contact between relatively movable parts. From the above description it will be noted that by suitable manipulation of the threaded element 28 located at the top portion of the casing 18, the headlamp body or casing 20 is capable of being readily adjusted to a different position, such for example as shown in dotted lines in Figure 2, to effect a vertical change in direction of the light beams, while adjustment of the other elements 28 may be utilized to modify the lateral direction of the light beams.

In order that water and foreign substances may be prevented from entering the headlight between the rim 22 and the lens 25, a cork or other suitable gasket 38 urges the lens 25 into contact with the rim 22, the gasket 38 being supported in a channel formation 39 of a flanged portion 40 of the reflector 42.

Figure 6 of the drawings particularly illustrates the headlamp embodying a form of reflector 42 preferably of the parabolic character positioned within the casing 20 of the headlight structure.

In the present arrangement the major part of the parabolic reflecting surface of reflector 42 is located below the substantially horizontally positioned or principal axis "a"—"a" of the paraboloid reflector. It is to be noted that a parabolic reflector equal in dimension with respect to the axis "a"—"a" would assume the configuration in dotted lines 42'. In the arrangement shown the portion of the conventional paraboloid indicated in dotted lines 42' generally utilized in headlamps has been modified to the form shown in Figure 6 which has several distinct advantages over prior structures. Such an arrangement is made possible through the slanting of the plane of the lens with respect to a horizontal axis, or out of parallelism with the parametric plane "b"—"b" of the reflector. This arrangement facilitates the streamlining or slanting of various forward portions of the vehicle providing a harmonious and pleasing appearance and at the same time obtaining various other distinctive advantages as will be hereinafter explained. The lens 25 forming a part of the arrangement is distinctively of oval configuration having distinctively longer vertical dimension than the widest lateral dimension. With the use of such an oval lens of the proper dimension the headlamp when viewed with the eye substantially at the horizontal axis of the reflector "a" the lens appears to be a perfect circle as illustrated in Figure 3 of the drawings.

The elements of my structure have been so positioned as to render effective illumination on the roadway and at the same time substantially eliminate glare in the eyes of approaching drivers, and to this end, a suitable lens is provided having vertical zones 52, 53 and 54, each vertical zone being provided with a plurality of substantially horizontal prisms and groups of vertical ribs or flutes, the flutes in zone 53 being preferably of lower spreading power than those in zones 52 and 54, as clearly shown in Figures 7, 8, and 9.

In Figures 7, 8, and 9, I have illustrated in detail fragmentary sections through several horizontal planes of the lens showing a portion of the vertical flutes in zone 53 and the flutes in zone 54, and it will be noted that the flutes in zone 54 are of greater spreading power than of those in the central zone 53. Zone 53 is provided throughout its major portion with a plurality of horizontal prisms 55, the remaining lower portion of the lens having horizontal prisms 56 which extend into zones 52 and 54. Prisms 55 and 56 are provided to divert the light rays emitted from the light source downwardly, as they pass through the lens. Zones 52 and 54 are also provided with a series of comparatively wide prisms 57 for deflecting the light beams from these side zones downwardly, the fewer number of wider prisms producing the desired angularity and concentration of the beam from these portions of the lens structure. I have found that it is preferable to have the effective refractive power of the prismatic structure of the zone 53 greater than the refractive power of the prisms in side zones 52 and 54.

Figure 10 illustrates the prisms provided in zone 54 wherein it will be noted that upon the face of the lens the area immediately below the central portion is substantially flat, a plurality of low prisms being provided adjacent the uppermost portion and a plurality of low prisms provided adjacent the lowermost portion. As illustrated in Figure 3, the central zone 53 is provided with a plurality of short prisms for redirecting the beams of light from the reflector 42. The illuminating means of the headlamp, as illustrated, includes independently usable main lighting filaments 43 and 44 positioned in the lamp bulb 45 and are located substantially in the parametric plane of the reflector and are spaced apart sufficiently to provide satisfactory driving and depressed beams. The lamp bulb 45 is carried in a suitable socket 46 in turn mounted upon a collar 47 which is secured by suitable means to the reflector 42. It is to be noted that light rays normally projected above and forwardly of the focal plane of the upper portion of the usual reflector will be eliminated by my structure, and that the light rays projected by filament 43 above the principal axis of the reflector will require only small shallow prisms as the beams intercepting the reflector at this point are already directed slightly downwardly by the reflector. The light rays from filament 44 which is positioned substantially at the focal point of the reflector and which produces the driving beam are projected substantially horizontally from the reflector, and thus shallow or small prisms utilized to slightly bend these rays downwardly as they leave the lens structure. In order that suitable light be provided adjacent the sides of the vehicle, the vertical flutes are provided for lateral distribution of the light beams.

It should be noted that in the embodiment showing a practical application of my invention one of the filaments is located substantially at the focal point of the reflector and the other spaced therefrom, but it should be understood that other filament arrangements could be used to provide satisfactory driving and depressed beams.

Positioned beneath the lamp bulb 45 is a second lamp bulb 48 supported in a socket 49 carried by the reflector and having a light source or filament of comparatively low candle power which may be energized seperately from the main filaments and utilized as a parking light.

It is apparent that, within the scope of the invention modifications and different arrangements may be made other than is herein disclosed, and the present disclosure is illustrative merely, the invention comprehending all variations thereof.

What I claim is:

1. In combination a support; a headlamp casing carried by said support; a reflector secured in said casing; a plurality of light sources positioned adjacent the focal point of the reflector; a lens disposed in front of said reflector and secured to said lamp casing; a plurality of spaced threaded members connecting said lamp casing and said support, said threaded members being accessible exteriorly of said support for adjusting said lamp casing, reflector and lens in both vertical and lateral directions and a sealing gasket carried by said threaded members and arranged between said support and the periphery of said headlamp casing.

2. In combination a vehicle fender having an opening in its forward portion; a headlamp casing positioned in said opening; a plurality of means connecting said fender to said headlamp casing, said means being accessible exteriorly of said fender for adjusting said headlamp casing in both vertical and lateral directions; a rubber gasket carried by said connecting means so that a portion thereof engages said casing; and a plurality of resilient means positioned adjacent said adjustable means for urging said headlamp casing to adjusted position.

3. In combination a lamp casing; a support therefor having an opening to accommodate the lamp casing; a plurality of threaded members connecting said lamp casing to said support at spaced points; said threaded members being accessible exteriorly of said support for adjusting said casing; resilient means interposed between said casing and support urging said lamp casing to adjusted position; and a flexible sealing gasket carried by said threaded members and engageable with a peripheral portion of the lamp casing.

4. In combination a lamp casing; a support therefor having an opening to accommodate the lamp casing; means for adjustably mounting said casing upon said support including at least three threaded members arranged in spaced relation, said threaded members being accessible exteriorly of said support for obtaining lateral and vertical adjustment of the lamp casing; resilient means interposed between said casing and support urging said lamp casing to adjusted position; and a flexible sealing gasket carried by said threaded members and engageable with a peripheral portion of the lamp casing.

ARTHUR J. BAKER.